Patented Dec. 9, 1952

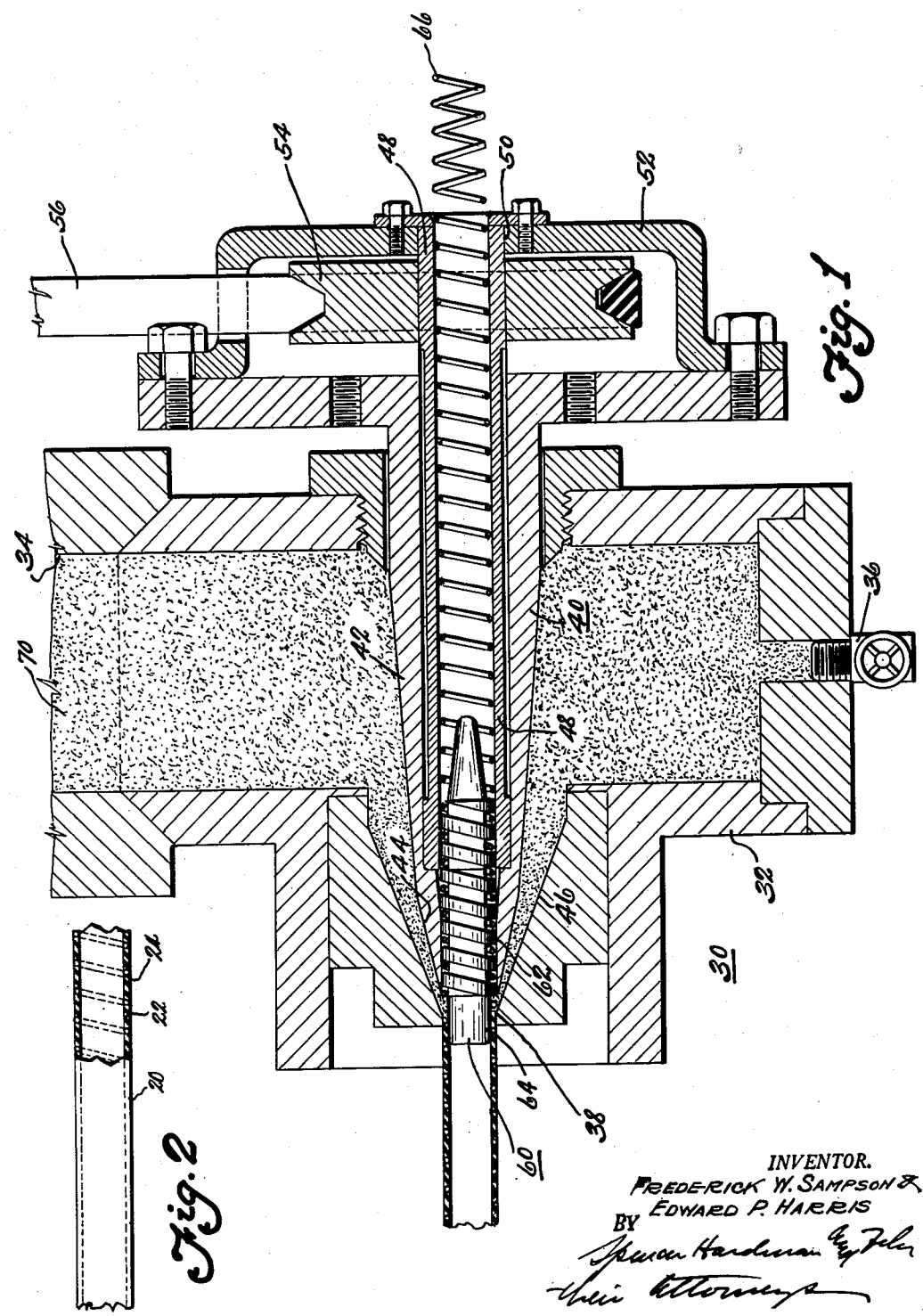

2,620,514

UNITED STATES PATENT OFFICE 2,620,514

APPARATUS FOR FORMING TUBING

Frederick W. Sampson and Edward P. Harris, Dayton, Ohio, assignors to General Motors Corporation, Detroit, Mich., a corporation of Delaware Application April 29, 1948, Serial No. 24,028

1 Claim. (Cl. 18—13)

It is the primary object of the invention to provide an apparatus for forming continuously reinforced flexible tubing. In carrying out the above object, it is a further object to provide an adapter which may be used in connection with a cross head tuber, which adapter feeds a coiled wire having the desired diameter of coil to the tuber nozzle in such a manner that a rubber-like covering is extruded continuously around the wire whereby the finished product of the apparatus may be cured to form a reinforced flexible tubing.

With the above object in mind, it is a further object to provide a motor driven adapter for feeding wire to a cross head tuber at any given rate whereby the spacing of the wire within the finished tubing may be controlled within reasonably close limits.

It is another object of the invention to provide an apparatus whereby wire reinforced flexible tubing may be made without a supporting mandrel and wherein such tubing may be produced continuously.

Another object of the invention is to provide a flexible reinforced tubing wherein the wall thickness of the tubing is the same throughout its entire extent.

Further objects and advantages of the present invention will be apparent from the following description, reference being had to the accompanying drawings, wherein:

Fig. 1 is a cross sectional view of a portion of a cross head tuber showing the wire feeding apparatus in place; and Fig. 2 is a view, partly in section, of a portion of a tube made on the apparatus shown in Fig. 1.

Reinforced flexible tubing in the past has been made on a mandrel wherein a wire coil is spaced upon the mandrel and then the covering is wound and lapped around and over the coil and mandrel whereupon the assembly is cured for effecting integration of the various parts thereof. The mandrel is next withdrawn and the finished tube is obtained. Obviously, when working with mandrels, the length of tubing is limited and the tubing which is used for various purposes is necessarily cut from the manufactured length, generally leaving unused end portions which increase the cost of the article.

The manufacturing aim in the fabrication in reinforced flexible tubing has been to produce such tubing in a continuous length or at least in long lengths whereby sections may be cut off leaving little or no waste. Furthermore, by continuously manufacturing the tubing, very little labor is necessary which markedly reduces the manufacturing cost due to the reduced handling.

We have found that tubing may be readily manufactured through the use of a cross head tuber or similar apparatus wherein a tube of rubber-like material is extruded and wherein a coil of wire is simultaneously supplied and is fed to the nozzle of the tuber for reinforcing the tube produced. We have found that by maintaining a predetermined feed or rubber-like material and diameter of coil, that the wire may be substantially completely imbedded in the rubber-like material or may be controlled to merely form an inside reinforcement for the tube which is bonded to the internal walls thereof. All of these variations may be easily accomplished by varying the rate of feed of the wire and the diameter of the coil with respect to the diameter of the nozzle of the tuber and the rate of feed of the rubber-like material.

A section of such tubing is shown at 20 in Fig. 2, wherein the rubber-like material is indicated at 22 and the wire coil reinforcement at 24. Specifically referring to Fig. 1, a tuber 30 is shown with a cross head 32 which includes a feeding channel 34, a controlled over-flow or bleed at 36 and a nozzle 38. Normally such a tuber arrangement would produce a rod or tube of rubber-like material as desired which product is extruded from the die or nozzle 38.

In apparatus for forming flexible reinforced tubing, an adapter 40 is provided which includes an elongated casing member 42 that has a tapered nose portion 44 thereon of a slope approaching but not identical to the internal slope 46 of the nozzle 38. Within this casing 42 is journaled a rotatable member 48 which has an outside bearing 50 carried by a bracket 52 external of the tuber. A pulley 54 is provided on the member 48 and is driven through belt 56 by a suitable motor not shown. At the opposite end of the rotatable member 48 is a plug member 60 which includes a square thread 62 thereon and an end plug 64 having a diameter substantially equal to the inner diameter desired in the tube. The pitch of thread on the rotatable member is equivalent to the pitch desired in the coiled wire reinforcement within the tube 20.

In practice, a coiled wire 66 is fed into the rotatable member 48 whereupon it engages the square thread 62. The plug member 60 is a sweat fit with the rotatable member 48 and rotates therewith whereby the wire 66 is advanced outwardly through the rotatable member 48 and fed to the nozzle portion 38 of the tuber without any rotation thereof. At the same time, rubber-like material is being extruded in tubular form due to the plug 64 and envelopes and surrounds completely the wire coil which has just passed from the square thread 62. In this manner, the coil spacing or pitch is maintained constant as the coil passes through the nozzle 38.

It is apparent that the machine is continuous in operation so long as the wire 66 and rubber-like compound 70 are fed thereto. In this manner, tubing 20 is produced continuously in any practical length desired.

In practice, the tubing 20 is either cured by passing it through a tube furnace continuously or by cutting it into lengths compatible with the curing ovens used or it may be cut in long lengths and coiled before being placed in a curing retort. These functions and expedients form no portion of this invention which is directed to the apparatus for forming continuously the reinforced tubing.

It is to be understood that any rubber-like material which is suitable for tubing may be used, for example, natural rubber compounds, reclaimed rubber compounds, butadiene-styrene copolymer compounds, butadiene-acrylonitrile copolymer compounds, polychloroprene compounds, plastic compounds, etc., compatible mixtures of any of the above or, for that matter, any compound which is capable of extrusion and subsequent cure.

In practice in the manufacture of a $\frac{1}{2}''$ I. D. by $\frac{5}{8}''$ O. D. reinforced tubing, spring wire of .041 thousandth of an inch diameter is used and the feeding thread 62 (3 threads per inch) is rotated at about 1300 R. P. M. The exact diameter of the plug portion 64 and the root diameter of the square thread 62 control to a large degree the enveloping action of the rubber-like compound around the wire. These two dimensions are maintained substantially equal. It will be noted that the root diameter of the thread 62 increases toward the plug end 64 on a taper. This expedient provides a better feed by bringing the wire to the desired diameter without excessive friction. The thickness of the wall of the rubber-like tube also controls the enveloping action since if this thickness is considerably greater than the diameter of the wire, more rubber-like material will be present. The feed pressure on the rubber-like material is also important and controlling and is best determined by trial. Control of these variables to manufacture a satisfactory tube may be practiced by any one who has operated the machine but a short time, since control methods are easy to master and the resulting product is uniform for any given setting of speeds and feeds. In the manufacture of the tubing mentioned herein, a plug 64 is used which has a diameter of $\frac{31}{64}''$ and the extrusion nozzle or die 38 is maintained at $\frac{17}{32}''$ to produce a $\frac{5}{8}''$ O. D. by $\frac{1}{2}''$ I. D. tube.

It is further manifest that the diameter of tubing produced by this method is not a limiting factor here for tubes of either large or small diameters may be easily made by the same method and the same type of apparatus.

While the embodiments of the present invention as herein disclosed, constitute preferred forms, it is to be understood that other forms might be adopted, all coming within the scope of the claim which follow.

What is claimed is as follows:

In an apparatus for forming tubing of rubber-like material reinforced with a helical wire coil throughout its length, said wire coil being enveloped by said rubber-like material, the combination comprising; a cross head tubing machine having an extrusion nozzle including an inner tapered bore, a stationary sleeve aligned with said bore and nozzle and terminating closely adjacent to said nozzle, said sleeve being tapered so as to provide an annular passage in cooperation with said bore, said passage having an ever-decreasing cross section toward said nozzle, wire feeding means within said sleeve and carried thereby consisting of a hollow rotatable shaft having an inside diameter sufficient to confine and pass a continuously supplied helical coil of wire, a cylindrical plug fixedly fastened at the inner end of said rotatable shaft and extending outwardly therefrom through said nozzle, said plug having a helically grooved outer surface terminating closely adjacent the end of said stationary sleeve for guiding and feeding said helical wire coil to said extrusion nozzle and for maintaining the spacing of said coil as the rubber-like material envelopes the same in said tapered passage, the outer end of said plug being substantially equal to the desired inner diameter of the tube being formed.

FREDERICK W. SAMPSON.
EDWARD P. HARRIS.

REFERENCES CITED

The following references are of record in the file of this patent:

UNITED STATES PATENTS

| Number | Name | Date |
|---|---|---|
| 133,219 | Gately | Nov. 19, 1872 |
| 1,314,670 | Juve et al. | Sept. 2, 1919 |
| 1,951,176 | Smith | Mar. 13, 1934 |
| 2,185,701 | Boyle | Jan. 2, 1940 |

FOREIGN PATENTS

| Number | Country | Date |
|---|---|---|
| 810,638 | France | Dec. 28, 1936 |